UNITED STATES PATENT OFFICE.

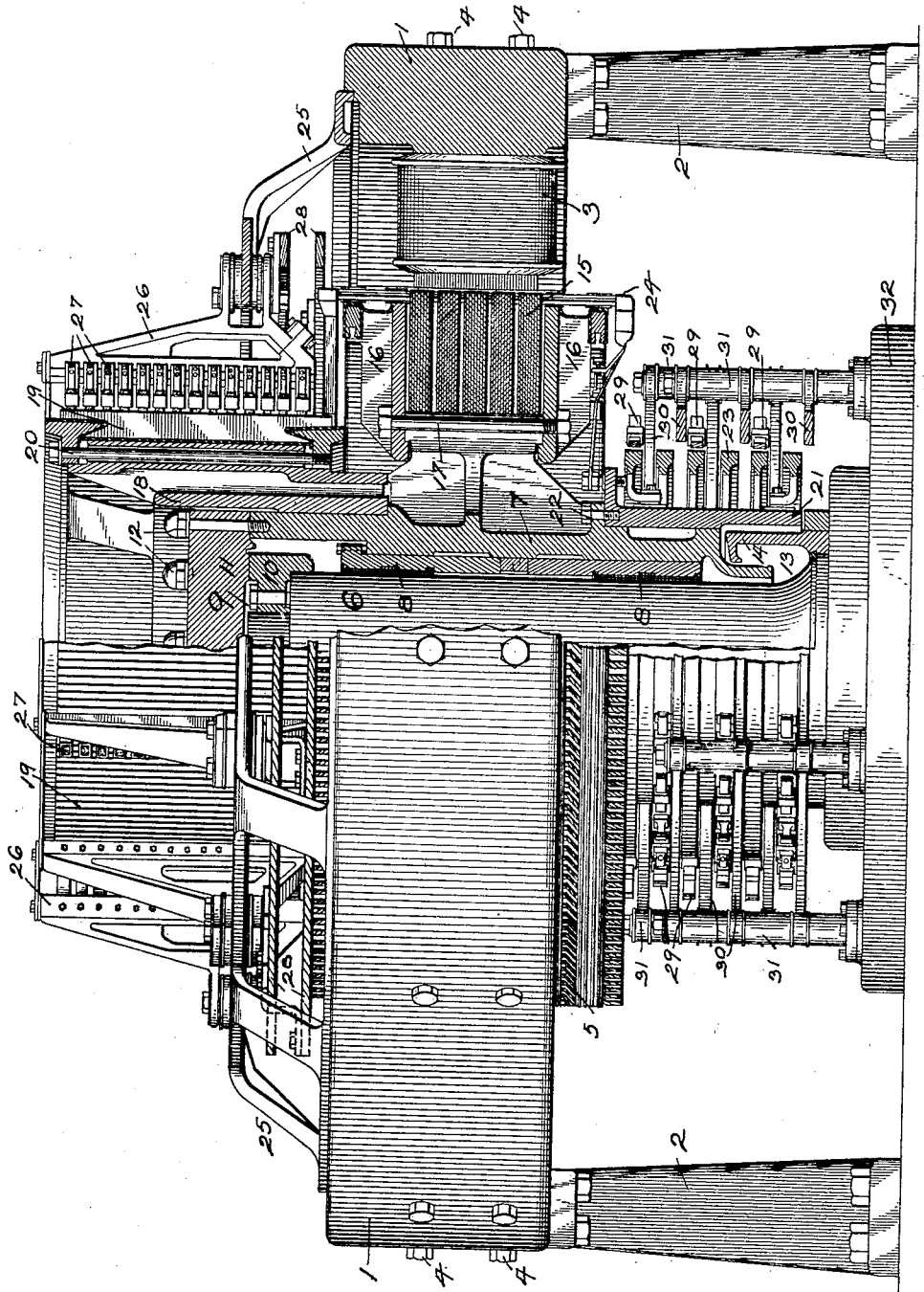

WILLIAM L. R. EMMET, OF SCHENECTADY, NEW YORK, ASSIGNOR TO GENERAL ELECTRIC COMPANY, A CORPORATION OF NEW YORK.

DYNAMO-ELECTRIC MACHINE.

No. 920,845.  Specification of Letters Patent.  Patented May 4, 1909.

Application filed November 22, 1907. Serial No. 403,312.

*To all whom it may concern:*

Be it known that I, WILLIAM L. R. EMMET, a citizen of the United States, residing at Schenectady, in the county of Schenectady and State of New York, have invented certain new and useful Improvements in Dynamo-Electric Machines, of which the following is a specification.

My present invention relates to dynamo-electric machines, and more particularly to rotary converters and motor generator sets, and has for its object, a novel construction and arrangement of parts.

The various forms of novelty which characterize my invention are pointed out with particularity in the claims annexed to and forming a part of this specification. For a better understanding of my invention however, and the advantages possessed by it, reference may be had to the following description taken in connection with the accompanying drawing, in which the figure is an elevation of a rotary converter embodying my invention, with parts broken away and in section.

1 is the frame of the rotary which is mounted in a horizontal plane on the pedestals 2, of which there are four in the present machine, only two of which, however, are shown. The poles on which the spools 3 are mounted are bolted to the frame by means of bolts 4. The armature 5 rotates about a stationary vertical spindle or shaft 6. The hub 7 of the armature spider carries a guide bearing 8 which surrounds the vertical shaft. In the design shown an oil or water thrust bearing is used. The fluid is forced through a suitable hole which extends throughout the length of the shaft into the chamber 9. The pumping means are exterior to the machine. The armature is lifted by the fluid pressure so that a film of fluid separates the step-bearing blocks 10 and 11. The block 11 is bolted to the hub 7 by means of bolts 12, and the block 10 is bolted to the end of the vertical shaft. The fluid after leaving the step, lubricates the guide bearing 8 and finally reaches the chamber 13, from which it is drained. A deflector 14 prevents its escape from this chamber.

To the armature spider are fastened the armature laminations 15 by means of plates 16 and bolts 17. The commutator shell 18 is pressed over the hub 7 as shown, and carries the commutator bars 19, which are held in place in the usual manner by bolts 20. The collector shell 21 is fastened to the hub as shown by bolts 22. The collector shell carries the collector rings 23. The armature conductors 24 are connected to the collector rings and commutator bars in the manner well known to those versed in the art. The brush holder yoke 25 is carried by the field frame and supports the brush holder brackets 26. The brackets carry the brushes 27 and are connected to the bus rings 28 in the usual manner. The collector brushes 29 are fastened to the brackets 30, which are supported by the collector studs 31, but insulated therefrom. These studs 31 are bolted to a pedestal 32, as shown, so as to hold them rigidly in place.

I have illustrated and described my invention as particularly applicable to rotary converters, but it is evident to those skilled in the art that it may be used in connection with motor generator sets, also that other forms of thrust bearings, such as ball or roller thrust bearings, may be used without departing from the spirit of my invention.

What I claim as new and desire to secure by Letters Patent of the United States, is—

1. A dynamo-electric machine comprising a stationary field member arranged in a horizontal plane, a stationary vertical shaft, a thrust bearing on top of said shaft, a rotatable member supported on said shaft, said rotatable member having a spider, a commutator shell and collector shell fastened to said spider, and a guide bearing carried by the spider and engaging said shaft.

2. A dynamo-electric machine comprising a stationary member arranged in a horizontal plane, a stationary vertical shaft, a thrust block on top of said shaft, a rotatable member supported on said shaft, said rotatable member having a spider, a second thrust block bolted to the hub of said spider and coöperating with said block on said shaft, a commutator shell and collector shell fastened to said hub, and a guide bearing carried by said hub and engaging said shaft.

3. A rotary converter comprising a stationary member arranged in a horizontal plane, a stationary vertical shaft, a thrust bearing on top of said shaft, a rotatable member supported by said shaft, said rotatable member having a spider, a commutator shell fastened to the top of said spider, a collector shell fastened to the bottom of said spider, collector rings on said collector shell, a guide bearing carried by the spider and engaging said shaft, brushes for said collector rings, studs supporting said brushes, and a pedestal to which said studs are fastened.

4. A rotary converter comprising a vertical shaft, a stationary field, a rotatable armature, said armature having a spider, a collector shell fastened to the hub of said spider, and a commutator shell forced on said hub, a thrust bearing on the top of said shaft supporting said armature, and a guide bearing carried by said hub and engaging said shaft.

5. A rotary converter comprising a stationary vertical shaft, a thrust block on top of said shaft, a stationary field arranged in a horizontal plane, a rotatable armature having a spider, a collector shell fastened to the hub of said spider, a commutator shell forced on said hub, a second thrust block bolted to said hub and coöperating with said block on said shaft, and a guide bearing carried by said hub and engaging said shaft.

In witness whereof, I have hereunto set my hand this 21st day of November, 1907.

WILLIAM L. R. EMMET.

Witnesses:
 BENJAMIN B. HULL,
 HELEN ORFORD.